(12) United States Patent
Saito et al.

(10) Patent No.: US 10,712,054 B2
(45) Date of Patent: Jul. 14, 2020

(54) THERMOACOUSTIC DEVICE

(71) Applicants: JTEKT CORPORATION, Osaka-shi, Osaka (JP); UNIVERSITY PUBLIC CORPORATION OSAKA, Osaka-shi, Osaka (JP)

(72) Inventors: Toshiyuki Saito, Kashiba (JP); Ryouichi Takahata, Kitakatsuragi-gun (JP); Tomoyuki Takei, Nara (JP); Osamu Ishikawa, Osaka (JP)

(73) Assignees: JTEKT CORPORATION, Osaka-shi (JP); UNIVERSITY PUBLIC CORPORATION OSAKA, Osaka-shi (JP)

( * ) Notice: Subject to any disclaimer, the term of this patent is extended or adjusted under 35 U.S.C. 154(b) by 0 days.

(21) Appl. No.: 16/343,197

(22) PCT Filed: Oct. 18, 2017

(86) PCT No.: PCT/JP2017/037637
§ 371 (c)(1),
(2) Date: Apr. 18, 2019

(87) PCT Pub. No.: WO2018/074501
PCT Pub. Date: Apr. 26, 2018

(65) Prior Publication Data
US 2019/0242624 A1 Aug. 8, 2019

(30) Foreign Application Priority Data

Oct. 18, 2016 (JP) ................. 2016-204530

(51) Int. Cl.
*H04R 1/00* (2006.01)
*F25B 9/14* (2006.01)
*F25B 9/00* (2006.01)

(52) U.S. Cl.
CPC ............. *F25B 9/145* (2013.01); *F25B 9/00* (2013.01); *F02G 2243/54* (2013.01); *F25B 2309/1403* (2013.01); *F25B 2309/1405* (2013.01)

(58) Field of Classification Search
CPC ........................................................ H04R 1/00
(Continued)

(56) References Cited

U.S. PATENT DOCUMENTS 6,032,464 A 3/2000 Swift et al.
2011/0293118 A1* 12/2011 Chang .................. H04R 23/002
381/164

(Continued)

FOREIGN PATENT DOCUMENTS

JP 2002-535597 A 10/2002
JP 2007-315680 A 12/2007
(Continued)

OTHER PUBLICATIONS

Jan. 16, 2018 International Search Report issued in International Patent Application PCT/JP2017/037637.
(Continued)

*Primary Examiner* — Suhan Ni
(74) *Attorney, Agent, or Firm* — Oliff PLC

(57) ABSTRACT

A thermoacoustic device includes a loop pipe, a first stack that is disposed in the loop pipe and that generates a sound wave in the loop pipe by way of a temperature gradient, a second stack that is disposed in the loop pipe and that generates a temperature gradient, a first high temperature side heat exchanger that is disposed at one end of the first stack and that makes the temperature of the one end of the first stack be higher than the other end, and a first low temperature side heat exchanger that is disposed at the other (Continued)

end of the first stack and that makes the temperature of the other end of the first stack be lower than the one end.

11 Claims, 9 Drawing Sheets

(58) Field of Classification Search
USPC .......................................................... 381/164
See application file for complete search history.

(56) References Cited

U.S. PATENT DOCUMENTS

| | | |
|---|---|---|
| 2013/0298547 A1 | 11/2013 | Yamamoto et al. |
| 2018/0045435 A1 | 2/2018 | Saito et al. |
| 2018/0073781 A1 | 3/2018 | Saito et al. |

FOREIGN PATENT DOCUMENTS

| | | | |
|---|---|---|---|
| JP | 2008-101910 A | 5/2008 |
| JP | 2011-127870 A | 6/2011 |
| JP | 2011-153742 A | 8/2011 |
| JP | 2012-159266 A | 8/2012 |
| JP | 2013-117324 A | 6/2013 |
| JP | 2013-234823 A | 11/2013 |
| JP | 2018-025340 A | 2/2018 |
| JP | 2018-044730 A | 3/2018 |

OTHER PUBLICATIONS

Jan. 16, 2018 Written Opinion issued in International Patent Application PCT/JP2017/037637.

* cited by examiner

THERMOACOUSTIC DEVICE

TECHNICAL FIELD

One aspect of the present invention relates to a thermoacoustic device that employs conversion between thermal energy and sound energy.

BACKGROUND ART

In recent years, thermoacoustic devices employing a thermoacoustic effect which is a conversion phenomenon between thermal energy and sound energy are proposed. For example, JP-A-2008-101910 (Patent Literature 1) discloses a thermoacoustic device in which a first stack and a second stack are disposed within a loop pipe. The first stack is sandwiched between a first high-temperature side heat exchanger and a first low-temperature side heat exchanger. The second stack is sandwiched between a second high-temperature side heat exchanger and a second low-temperature side heat exchanger. In the thermoacoustic device, a self-excited sound wave is generated by a temperature gradient generated in the first stack. The second low-temperature side heat exchanger can be cooled by this sound wave.

JP-A-2008-101910 discloses a technique in which efficiency of heat exchange in the stack is improved by appropriately setting a length of the loop pipe, a state of a working fluid enclosed in the loop pipe, a diameter of a conduction path of the first stack and the second stack, and the like.

JP-A-2012-159266 (Patent Literature 2) discloses a configuration in which a blocking wall for blocking moving gas is installed in a pipe in which a motor and a refrigerator are formed. The blocking wall is installed so as to be capable of vibrating accompanying with vibration of gas. A circulation flow of the gas is prevented by the blocking wall. As a result, cooling insufficiency caused by the circulation flow of the gas is prevented.

JP-A-2011-127870 (Patent Literature 3) discloses a thermoacoustic engine, which includes: a first loop pipe in which a motor is disposed to convert thermal energy into sound energy; a second loop pipe in which a passive device is disposed to convert sound energy into thermal energy; and a connection pipe that connects the first loop pipe and the second loop pipe to each other. A vibrator that separates a working fluid of the first loop pipe and a working fluid of the second loop pipe is provided in the connection pipe. The vibrator is configured to be capable of vibrating in a vibration direction of a working fluid. The two separated working fluids and the vibrator vibrate at a predetermined resonance frequency. As a result, a sound wave is generated at a frequency lower than a frequency defined by loop lengths of the first loop pipe and the second loop pipe. Therefore, the same effect as in a case where a resonance pipe having a length equal to or longer than three times the loop lengths of the first loop pipe and the second loop pipe is provided between the first loop pipe and the second loop pipe is obtained. Since the resonance pipe having such a length is thus made unnecessary, the thermoacoustic engine can be downsized, and sound wave attenuation can be reduced.

PRIOR ART LITERATURE

Patent Literature

[Patent Literature 1] JP-A-2008-101910
[Patent Literature 2] JP-A-2012-159266
[Patent Literature 3] JP-A-2011-127870

SUMMARY OF INVENTION

Technical Problems

In the prior art described above, the blocking wall or the vibrator, which is capable of vibrating, is provided in the pipe of the thermoacoustic device. The blocking plate is provided to prevent the circulation of the gas in the loop pipe. The vibrator is provided to separate the gas of the two loop pipes to control vibration.

The present application discloses a technique that amplifies a sound wave of a loop pipe by a vibration plate in a thermoacoustic device.

Solution to Problem

A thermoacoustic device according to an aspect of the invention comprising:
 a loop pipe;
 a first stack disposed within the loop pipe, the first stack generating a sound wave in the loop pipe by a temperature gradient in the first stack;
 a second stack disposed within the loop pipe, the second stack generating a temperature gradient in the second stack by the sound wave of the loop pipe;
 a first high-temperature side heat exchanger disposed at one end of the first stack which brings the one end of the first stack to a higher temperature than another end of the first stack;
 a first low-temperature side heat exchanger disposed at the other end of the first stack which brings the other end of the first stack to a lower temperature than the one end;
 a second high-temperature side heat exchanger disposed at an end, which is closer to the first high-temperature side heat exchanger, among two ends of the second stack;
 a second low-temperature side heat exchanger disposed at an end, which is closer to the first low-temperature side heat exchanger, among two ends of the second stack; and
 a first vibration plate, disposed in the loop pipe between the end of the second stack where the second high-temperature side heat exchanger is disposed and the one end of the first stack, which vibrates in an axial direction of the loop pipe.

Advantageous Effects of Invention

According to the present disclosure, a sound wave of the loop pipe can be amplified in the thermoacoustic device.

DESCRIPTION OF EMBODIMENTS

Figure 1:
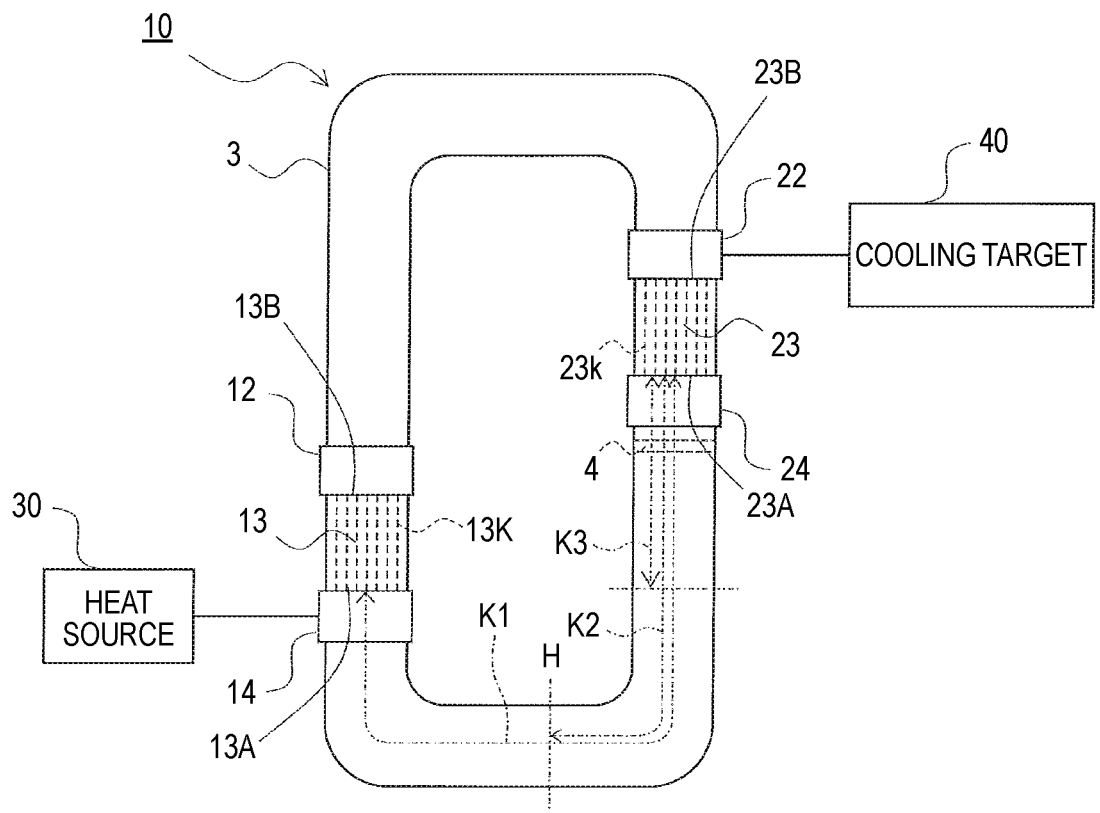
FIG. 1 shows a configuration example of a thermoacoustic device according to Embodiment 1.

A thermoacoustic device according to an aspect of the invention includes: a loop pipe; a first stack disposed within the loop pipe, the first stack generating a sound wave in the loop pipe by a temperature gradient in the first stack; a second stack disposed within the loop pipe, the second stack generating a temperature gradient in the second stack by the sound wave of the loop pipe; a first high-temperature side heat exchanger disposed at one end of the first stack which brings the one end of the first stack to a higher temperature than another end of the first stack; a first low-temperature side heat exchanger disposed at the other end of the first stack which brings the other end of the first stack to a lower temperature than the one end; a second high-temperature side heat exchanger disposed at an end, which is closer to the first high-temperature side heat exchanger, among two ends of the second stack; a second low-temperature side heat exchanger disposed at an end, which is closer to the first low-temperature side heat exchanger, among two ends of the second stack; and a first vibration plate, disposed in the loop pipe between the end of the second stack where the second high-temperature side heat exchanger is disposed and the one end of the first stack, which vibrates in an axial direction of the loop pipe (a first configuration).

In the first configuration, the temperature gradient is generated at one end and the other end of the first stack by the first high-temperature side heat exchanger and the first low-temperature side heat exchanger. A sound wave is generated in a working fluid in the loop pipe by the temperature gradient of the first stack. A temperature gradient is generated in the second stack by this sound wave. Due to this temperature gradient, a temperature of the end of the second stack on the side of the first low-temperature side heat exchanger becomes lower than a temperature of the end of the second stack on the side of the first high-temperature side heat exchanger. For example, the temperature of the low-temperature side end of the second stack can be controlled to be lower through controlling the temperature of the high-temperature side end of the second stack by the second high-temperature side heat exchanger of the second stack. In this case, a cooling target outside the loop pipe can be cooled by the second low-temperature side heat exchanger. In the thermoacoustic device, the first vibration plate is provided between the end where the second high-temperature side heat exchanger of the second stack is disposed and the one end where the first high-temperature side heat exchanger of the first stack is disposed. The sound wave generated by the temperature gradient of the first stack can be amplified by providing the first vibration plate at this position. As a result, conversion efficiency between sound energy and thermal energy can be improved. Here, the amplification of the sound wave performed by the first vibration plate also includes a case where sound wave attenuation is reduced.

In the first configuration described above, the end among the two ends of the second stack where the second high-temperature side heat exchanger is disposed, and the first vibration plate can be disposed within a range of a first distance with reference to a position at a distance of one half of a pipe length of the loop pipe from the one end of the first stack. Here, the first distance corresponds to a length of a part of the loop pipe that is $1/\sqrt{2}$ to 1 times with respect to a maximum amplitude of a sound wave, the sound wave being a first mode frequency sound wave generated in the loop pipe by the temperature gradient of the first stack (a second configuration).

In the second configuration, the first vibration plate and the high-temperature side end of the second stack are disposed in a section of the loop pipe corresponding to the position at the distance of one half of the pipe length of the loop pipe from the one end of the high-temperature side of the first stack. Accordingly, an effect of the first vibration plate of amplifying the sound wave generated by the temperature gradient of the first stack can be further improved.

"Distance" in the above-mentioned "distance of one half of the pipe length of the loop pipe from the one end of the first stack" and the "first distance" refers to a distance of a path of the loop pipe. The distance of the path of the loop pipe refers to a distance of a path which passes through a central axis in the loop pipe. The same applies to a "distance" described below.

In the first or second configuration, a distance between the end among the two ends of the second stack where the second high-temperature side heat exchanger is disposed and the first vibration plate is equal to or less than ¼ of the pipe length of the loop pipe (a third configuration).

In the third configuration described above, the first vibration plate is disposed in a section at a distance of one fourth of the pipe length of the loop pipe from the high-temperature side end of the second stack. Accordingly, an effect of the first vibration plate of amplifying the sound wave generated by the temperature gradient of the first stack can be further improved.

In any one of the first to second configurations, the thermoacoustic device may further include a second vibration plate, disposed in the loop pipe between the end among the two ends of the second stack where the second low-temperature side heat exchanger is disposed and the other end of the first stack, which is capable of vibrating in the axial direction of the loop pipe (a fourth configuration). The sound wave generated by the temperature gradient of the first stack can be further amplified by the second vibration plate.

In the fourth configuration described above, the second vibration plate may be disposed within a second distance from the end among the two ends of the first stack where the first low-temperature side heat exchanger is disposed. Here, the second distance corresponds to a length of a part of the loop pipe that is $1/\sqrt{2}$ to 1 times with respect to a maximum amplitude of a sound wave, the sound wave being a first mode frequency sound wave generated in the loop pipe by the temperature gradient of the first stack (a fifth configuration). Accordingly, the effect of amplifying the sound wave generated by the temperature gradient of the first stack can be further improved by the second vibration plate. A distance between the end among the two ends of the first stack where the first low-temperature side heat exchanger is disposed and the second vibration plate can also be equal to or less than ¼ of the pipe length of the loop pipe. The sound wave amplification effect of the second vibration plate can also be improved in this case.

In any of the first to fifth configurations described above, a loss factor tan δ can satisfy 0≤tan δ≤0.5 at a time when the first vibration plate vibrates at a resonance frequency at 25° C. (a sixth configuration). Preferably, the loss factor tan δ of the first vibration plate can satisfy 0≤tan δ≤0.2, and can more preferably satisfy 0≤tan δ≤0.025. That is, the loss factor tan δ of the first vibration plate is preferably 0.5 or less, more preferably 0.2 or less, and further more preferably 0.025 or less. The loss factor tan δ of the first vibration plate can be 0 or more. In this way, viscosity of the first vibration plate is reduced, thus the effect provided by the first vibration plate of amplifying the sound wave of the loop pipe generated by the temperature gradient of the first stack can be further improved.

As for the second vibration plate, a loss factor tan δ2 can satisfy 0≤tan δ2≤0.5 at a time when the second vibration plate vibrates at a resonance frequency at 25° C. Preferably, the loss factor tan δ2 of the second vibration plate can satisfy 0≤tan δ2≤0.2, and can more preferably satisfy 0≤tan δ2≤0.025. That is, the loss factor tan δ2 of the second vibration plate is preferably 0.5 or less, more preferably 0.2 or less, and further more preferably 0.025 or less. The loss factor tan δ2 of the second vibration plate can be 0 or more. Accordingly, the sound wave amplification effect of the second vibration plate can be further improved.

In any of the first to sixth configurations, a drive frequency D of the first vibration plate and a resonance frequency F of the loop pipe can have a relationship of D/F≥0.8 (a seventh configuration). Accordingly, the effect provided by the first vibration plate of amplifying the sound wave of the loop pipe generated by the temperature gradient of the first stack can be further improved. The driven frequency D is a frequency of the first vibration plate vibrated by the sound wave of the loop pipe. As for the second vibration plate, a drive frequency D2 of the second vibration plate and the resonance frequency F of the loop pipe can have a relationship of D2/F≥0.8. Accordingly, the sound wave amplification effect of the second vibration plate can be further improved. The driven frequency D2 is a frequency of the second vibration plate vibrated by the sound wave of the loop pipe.

In any of the first to seventh configurations, the first vibration plate can be formed of resin or metal (an eighth configuration). Since the first vibration plate is formed by resin or metal, the viscosity of the first vibration plate is made appropriate from a viewpoint of the sound wave amplification effect. Therefore, the effect provided by the first vibration plate of amplifying the sound wave of the loop pipe generated by the temperature gradient of the first stack can be further improved. The second vibration plate can also be formed of resin or metal. Accordingly, the sound wave amplification effect of the second vibration plate can be further improved.

In any of the first to eighth configurations, the first vibration plate may be disposed within the first distance from an antinode position of a first mode frequency sound wave generated in the loop pipe by the temperature gradient of the first stack. Here, the first distance corresponds to a length of a part of the loop pipe that is 1/√2 to 1 times with respect to a maximum amplitude of a sound wave, the sound wave being a first mode frequency sound wave generated in the loop pipe by the temperature gradient of the first stack (a ninth configuration).

In the ninth configuration, the first vibration plate is disposed in a section of the loop pipe corresponding to the antinode position of the first mode frequency sound wave generated in the loop pipe by the temperature gradient of the first stack. Accordingly, an effect of the first vibration plate of amplifying the sound wave generated by the temperature gradient of the first stack can be further improved. The first distance can be one tenth of the pipe length of the loop pipe. The sound wave amplification effect of the first vibration plate can also be improved in this case.

The second vibration plate may be disposed within the first distance from the antinode position of the first mode frequency sound wave generated in the loop pipe by the temperature gradient of the first stack. Accordingly, the sound wave amplification effect of the second vibration plate can be further improved.

In any of the first to ninth configurations, the end among the two ends of the second stack where the second high-temperature side heat exchanger is disposed and the first vibration plate may be disposed on opposite sides so as to sandwich a position located one half the pipe length of the loop pipe away from the one end of the first stack (a tenth configuration). That is, the position located one half the pipe length of the loop pipe away from the high-temperature side end of the first stack toward the high-temperature side of the second stack may be disposed between the first vibration plate and the high-temperature side end of the second stack. Accordingly, the effect of the first vibration plate of amplifying the sound wave generated by the temperature gradient of the first stack can be further improved.

In any of the first to tenth configurations, the first vibration plate may be disposed at a position closer to the second stack than a center position of a path in the pipe from the end among the two ends of the second stack where the second high-temperature side heat exchanger is disposed to the one end of the first stack (an eleventh configuration). Accordingly, the effect of the first vibration plate of amplifying the sound wave generated by the temperature gradient of the first stack can be further improved.

Hereinafter, embodiments will be described with reference to the drawings. In the drawings, the same or corresponding configurations are denoted by the same reference numerals, and the same description will not be repeated. For convenience of description, in each figure, there are cases where a configuration may be shown in a simplified or schematic manner, and a part of the configuration may be omitted.

Embodiment 1

[Configuration Example of Thermoacoustic Device]

FIG. 1 shows a configuration example of a thermoacoustic device according to the present embodiment. A thermoacoustic device 10 includes one loop pipe 3, and a first stack 13 and a second stack 23 provided in the loop pipe 3. A working fluid is sealed in the loop pipe 3. The working fluid can be, for example, air, nitrogen, helium, argon, or mixed gas including at least two of the above. No branch pipe is connected to the loop pipe 3.

The first stack 13 includes a plurality of conduction paths 13$k$ passing through a length direction (also can be referred to as an axial direction or an in-pipe path direction) of the loop pipe 3. The second stack 23 also includes a plurality of conduction paths 23k passing through the length direction of the loop pipe 3. The conductive paths 13k and 23k are flow paths of the working fluid. That is, the working fluid is movable in the conduction paths 13k and 23k in the first stack 13 and the second stack 23. The working fluid can pass through the first stack 13 and the second stack 23 in the length direction of the loop pipe 3. A stack can also be referred to as a heat accumulator.

The working fluid in the stack 13 vibrates when a temperature gradient in the first stack 13 exceeds a critical point. The working fluid in the stack 23 vibrates when a temperature gradient in the second stack 23 exceeds a critical point. A sound wave is generated by the vibration of the working fluid. As a result, a sound wave including a standing wave is generated in the working fluid in the loop pipe 3. A temperature gradient is generated in the first stack 13 or the second stack 23 when the working fluid in the first stack 13 or the second stack 23 is vibrated by the sound wave in the loop pipe 3. The temperature gradient is generated between one end (one end side) 13A and another end (another side) 13B of the first stack 13 in the length direction of the loop pipe 3. Similarly, the temperature gradient is generated between one end (one end side) 23A and another end (another side) 23B of the second stack 23 in the length direction of the loop pipe 3. In this way, the first stack 13 and the second stack 23 can mutually convert thermal energy and sound energy.

For example, the conductive paths 13k and 23k can be formed in the first stack 13 and the second stack 23 by a plurality of walls extending in the length direction of the loop pipe 3. In this case, cross sectional shapes of the plurality of walls perpendicular to the length direction of the loop pipe 3 can be, for example, lattice shapes. Alternatively, the first stack 13 and the second stack 23 can have a structure in which a plurality of holes passing through the length direction of the loop pipe 3 are provided in a column body extending in the same length direction. Alternatively, the first stack 13 and the second stack 23 can have a structure in which a plurality of hollow columns extending in the length direction of the loop pipe 3 are provided in parallel, the columns including holes passing through the length direction of the loop pipe 3. In this case, for example, the columns can be provided in parallel without gaps therebetween through making cross sections of surfaces perpendicular to axial directions of each column hexagonal. That is, the first stack 13 and the second stack 23 can have honeycomb structures.

The first stack 13 and the second stack 23 can be made of metal, ceramic, or the like, for example. The first stack 13 and the second stack 23 preferably have a large number of conduction paths 13k and 23k. An area of cross section of each conduction path 13k or 23k perpendicular to the direction of the loop pipe 3 is preferably sufficiently smaller than an area of the same cross section inside the loop pipe 3. The first stack 13 and the second stack 23 may not necessarily have the same configuration.

In the present embodiment, a temperature of the one end 13A of the first stack 13 is higher than a temperature of the other end 13B, such that a temperature gradient is generated. A sound wave is generated in the loop pipe 3 by the temperature gradient in the first stack 13. A temperature gradient is generated in the second stack 23 by the sound wave generated by the temperature gradient in the first stack 13.

Heat exchangers 14, 24, 12 and 22 are provided at the one ends 13A and 23A and the other ends 13B and 23B of the first stack 13 and the second stack 23, respectively. The heat exchangers 14, 24, 12 and 22 exchange heat between an exterior part of the loop pipe 3 and the first stack 13 or the second stack 23. During operation of the thermoacoustic device 10, a sound wave is generated in the loop pipe 3, and temperature gradients are generated between the one end 13A and the other end 13B of the first stack 13 and between the one end 23A and the other end 23B of the second stack 23. Among the two ends of the first stack 13, the heat exchanger 14 disposed at the one end 13A which has a higher temperature during operation of the thermoacoustic device 10 is referred to as a first high-temperature side heat exchanger 14, and the heat exchanger 12 disposed at the other end 13B which has a lower temperature is referred to as a first low-temperature side heat exchanger 12. Among the two ends of the second stack 23, the heat exchanger 24 disposed at the one end 23A which has a higher temperature during operation of the thermoacoustic device 10 is referred to as a second high-temperature side heat exchanger 24, and the heat exchanger 22 disposed at the other end 23B which has a lower temperature is referred to as a second low-temperature side heat exchanger 22. The heat exchangers 14, 24, 12 and 22 may not necessarily connected with the one ends 13A and 23A or the other ends 13B and 23B of the stack 13 or 23.

The first high-temperature side heat exchanger 14 is disposed at a position corresponding to the one end 13A of the first stack 13. The first high-temperature side heat exchanger 14 may include, for example, an in-pipe portion disposed in the loop pipe 3 and an out-pipe portion disposed outside the loop pipe 3. The in-pipe portion can be configured to have a plurality of conduction paths facing to the one end 13A of the first stack 13 in the loop pipe 3. The out-pipe portion can be disposed at a position corresponding to the one end 13A of the first stack 13 on an outer peripheral surface of the loop pipe 3.

The first low-temperature side heat exchanger 12 is disposed at a position corresponding to the other end 13B of the first stack 13. The first low-temperature side heat exchanger 12 may include, for example, an in-pipe portion disposed in the loop pipe 3 and an out-pipe portion disposed outside the loop pipe 3. The in-pipe portion can be configured to have a plurality of conduction paths facing to the other end 13B of the first stack 13 in the loop pipe 3. The out-pipe portion can be disposed at a position corresponding to the other end 13B of the first stack 13 on an outer peripheral surface of the loop pipe 3. In this way, the first high-temperature side heat exchanger 14 and the first low-temperature side heat exchanger 12 are disposed at the two ends of the first stack 13 in the length direction of the loop pipe 3. The first high-temperature side heat exchanger 14 and the first low-temperature side heat exchanger 12 are disposed with the first stack 13 sandwiched therebetween.

The first high-temperature side heat exchanger 14 heats the one end 13A of the first stack 13 by heat from the outside of the loop pipe 3. The one end 13A of the first stack 13 is brought to a higher temperature than the other end 13B by the first high-temperature side heat exchanger 14. The first high-temperature side heat exchanger 14 is connected to an external heat source 30 in a heat-conductive manner. Heat of the heat source 30 is transmitted to the one end 13A of the first stack 13 through the first high-temperature side heat exchanger 14.

The first low-temperature side heat exchanger 12 adjusts the temperature of the other end 13B of the first stack 13 by conducting heat between the outside of the loop pipe 3 and the other end 13B of the first stack 13. For example, the first low-temperature side heat exchanger 12 can prevent the temperature of the other end 13B of the first stack 13 from exceeding a predetermined reference temperature. The other end 13B of the first stack 13 is brought to a lower temperature than the one end 13A by the first low-temperature side heat exchanger 12. In this way, the temperature gradient (temperature difference) between the one end 13A and the other end 13B of the first stack 13 can be controlled by the first high-temperature side heat exchanger 14 and the first low-temperature side heat exchanger 12.

The first low-temperature side heat exchanger 12, the first stack 13, and the first high-temperature side heat exchanger 14 constitute a thermoacoustic motor (thermoacoustic engine) that converts input heat into vibration of a working fluid to generate a sound wave.

In the present embodiment, the temperature gradient is generated in the second stack 23 by a sound wave generated by the temperature gradient generated in the first stack 13, and the temperature of the other end 23B of the second stack 23 is lower than the temperature of the one end 23A. The second high-temperature side heat exchanger 24 is provided at the one end 23A which is brought to a high temperature when a temperature gradient is generated in the second stack 23 due to the temperature gradient in the first stack 13. The second low-temperature side heat exchanger 22 is provided at the other end 23B which is brought to a low temperature when a temperature gradient is generated in the second stack 23 due to the temperature gradient in the first stack 13.

In other words, the second high-temperature side heat exchanger 24 is disposed at an end (the one end 23A) among the two ends of the second stack 23 on the side of the first high-temperature side heat exchanger 14. The second low-temperature side heat exchanger 22 is disposed at an end (the other end 23B) among the two ends of the second stack 23 on the side of the first low-temperature side heat exchanger 12. Here, being toward the first high-temperature side heat exchanger 14 means to be toward the first high-temperature side heat exchanger 14 in a path in the loop pipe 3. That is, the first high-temperature side heat exchanger 14 is reached before the first low-temperature side heat exchanger 12 is reached when exiting from the one end 23A of the stack 23 toward the first high-temperature side heat exchanger 14 and travelling along the path in the loop pipe 3. Similarly, being toward the first low-temperature side heat exchanger 12 means to be toward the first low-temperature side heat exchanger 12 in a path in the loop pipe 3. That is, the first low-temperature side heat exchanger 12 is reached before the first high-temperature side heat exchanger 14 is reached when exiting from the other end 23B of the stack 23 toward the first low-temperature side heat exchanger 12 and travelling along the path in the loop pipe 3.

The second high-temperature side heat exchanger 24 is disposed at a position corresponding to the one end 23A of the second stack 23. The second high-temperature side heat exchanger 24 may include, for example, an in-pipe portion disposed in the loop pipe 3 and an out-pipe portion disposed outside the loop pipe 3. The in-pipe portion can be configured to have a plurality of conduction paths facing to the one end 23A of the second stack 23 in the loop pipe 3. The out-pipe portion can be disposed at a position corresponding to the one end 23A of the second stack 23 on an outer peripheral surface of the loop pipe 3.

The second low-temperature side heat exchanger 22 is disposed at a position corresponding to the other end 23B of the second stack 23. The second low-temperature side heat exchanger 22 may include, for example, an in-pipe portion disposed in the loop pipe 3 and an out-pipe portion disposed outside the loop pipe 3. The in-pipe portion can be configured to have a plurality of conduction paths facing to the other end 23B of the second stack 23 in the loop pipe 3. The out-pipe portion can be disposed at a position corresponding to the other end 23B of the second stack 23 on an outer peripheral surface of the loop pipe 3. In this way, the second high-temperature side heat exchanger 24 and the second low-temperature side heat exchanger 22 are disposed at the two ends of the second stack 23 in the length direction of the loop pipe 3. The second high-temperature side heat exchanger 24 and the second low-temperature side heat exchanger 22 are disposed with the second stack 23 sandwiched therebetween.

The second high-temperature side heat exchanger 24 adjusts the temperature of the one end 23A of the second stack 23 by conducting heat between the outside of the loop pipe 3 and the one end 23A of the second stack 23. For example, the second high-temperature side heat exchanger 24 can keep the temperature of the one end 23A of the second stack 23 constant.

The second low-temperature side heat exchanger 22 absorbs heat outside the loop pipe 3 and provides the heat to the other end 23B of the second stack 23. Accordingly, the outside of the loop pipe 3 is cooled. In other words, the second low-temperature side heat exchanger 22 takes out cold heat of the other end 23B of the second stack 23 whose temperature is lowered by the temperature gradient generated in the second stack 23, and transmits the cold heat to the outside of the loop pipe 3. The second low-temperature side heat exchanger 22 is, for example, connected to a cooling target 40 outside the loop pipe 3 in a heat-conductive manner.

The second low-temperature side heat exchanger 22, the second stack 23, and the second high-temperature side heat exchanger constitute a thermoacoustic heat pump that generates a temperature gradient from a sound wave (vibration of a working fluid).

In the configuration shown in FIG. 1, the heat of the heat source 30 is transmitted to the one end 13A of the first stack 13 through the first high-temperature side heat exchanger 14. Accordingly, the one end 13A of the first stack 13 is heated. The first low-temperature side heat exchanger 12 maintains the other end 13B of the first stack 13 below a predetermined first reference temperature (for example, room temperature) by conducting heat between the outside of the loop pipe 3 and the other end 13B of the first stack 13. Accordingly, the temperature of the one end 13A of the first stack 13 is higher than the temperature of the other end 13B. That is, a temperature gradient (temperature difference) is generated between the one end 13A and the other end 13B of the first stack 13.

The working fluid in the first stack 13 vibrates and generates a sound wave when the temperature gradient in the first stack 13 exceeds a critical point. The vibration of the working fluid in the first stack 13 is transmitted to the working fluid in the loop pipe 3. Accordingly, a sound wave is generated in the loop pipe 3. The working fluid of the second stack 23 is vibrated by the vibration of the sound wave. The working fluid in the second stack 23 vibrates, and a temperature gradient (temperature gradient) is generated in the second stack 23. That is, the temperature of the one end 23A of the second stack 23 is higher than the temperature of the other end 23B.

The second high-temperature side heat exchanger 24 maintains the one end 23A of the second stack 23 below a predetermined second reference temperature (for example, room temperature) by conducting heat between the outside of the loop pipe 3 and the one end 23A of the second stack 23. Therefore, a temperature gradient is generated in the second stack 23, and the temperature of the other end 23B of the second stack 23 is lower than the second reference temperature. That is, the other end 23B of the second stack 23 is cooled. The second low-temperature side heat exchanger 22 transmits cold heat of the other end 23B of the second stack 23 to the cooling target 40 outside the loop pipe 3. Accordingly, the cooling target 40 is cooled.

[Configuration Example of Vibration Plate]

In prior art, movement of gas is blocked by a blocking wall that separates a working fluid in a loop pipe of a thermoacoustic device (refer to JP-A-2012-159266, for example). It is preferable that the blocking wall in such a loop pipe does not interfere with vibration of a sound wave necessary for operation of the thermoacoustic device. The blocking wall is configured to be capable of vibrating without interfering with the vibration of the sound wave. The inventors studied various configurations of a vibration film provided in the loop pipe, and found that the sound wave in the loop pipe can be amplified under certain conditions by providing a vibration plate in the loop pipe. As a result of further study, the inventors found that the sound wave in the loop pipe which contributes to the operation of the thermoacoustic device can be amplified by providing the vibration plate on a path of the loop pipe between a high-temperature side end of a first stack and a high-temperature side end of a second stack. The configuration of the thermoacoustic device 10 of the present embodiment is based on such knowledge.

A first vibration plate 4 is provided between the one end 23A of the second stack 23 where the second high-temperature side heat exchanger 24 is disposed and the one end 13A of the first stack 13 where the first high-temperature side heat exchanger 14 is disposed. The first vibration plate 4 is a plate that is capable of vibrating in the axial direction (length direction) of the loop pipe 3. The first vibration plate 4 is formed of a plate-shaped elastic body. The first vibration plate 4 is disposed on a path K1 of the loop pipe 3 between the one end 13A of the first stack 13 and the one end 23A of the second stack 23 in the loop pipe 3. Through disposing the first vibration plate 4 at this position, the sound wave in the loop pipe 3 generated by the temperature gradient of the first stack 13 can be amplified by the first vibration plate 4. A frequency of the sound wave generated by the temperature gradient of the first stack is adjusted by the first vibration plate 4 disposed at this position. Accordingly, efficiency of a thermoacoustic effect can be improved.

In the example shown in FIG. 1, the first vibration plate 4 is disposed at a position closer to the second stack 23 (a position on a path K2) than a position of a center H of the path K1 in the loop pipe 3 from the one end 13A of the first stack 13 to the one end 23A of the second stack 23. Accordingly, a sound wave amplification effect can be improved by the first vibration plate 4. Preferably, the first vibration plate 4 can be provided at a position in the path K1 of the loop pipe 3 from the one end 13A of the first stack 13 to the one end 23A of the second stack 23 within one fourth of a length of the path K1 on the side of the second stack 23 (a position on a path K3).

Figure 2:
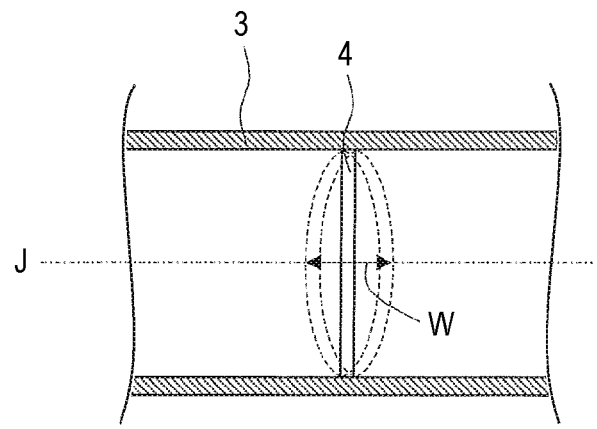
FIG. 2 is a cross-sectional view of a loop pipe 3 in which a first vibration plate 4 is disposed.

FIG. 2 is a cross-sectional view of the loop pipe 3 in which the first vibration plate 4 is disposed. FIG. 2 shows a cross section of the first vibration plate 4 and the loop pipe 3 on a plane including a central axis J of the loop pipe 3. As shown in FIG. 2, an end of the first vibration plate 4 is fixed to an inner surface of the loop pipe 3. A surface of the first vibration plate 4 is disposed perpendicular to the central axis J of the loop pipe 3. The first vibration plate 4 is capable of vibrating in the axial direction (length direction) of the loop pipe 3. In the example of FIG. 2, an amplitude W is largest at a center portion of the first vibration plate 4 (a portion through which the central axis J of the loop pipe 3 passes).

[Vibration Plate Arrangement Position]

As a result of intensive studies on an arrangement position of the first vibration plate 4, the inventors conceived an arrangement example of the first vibration plate 4 described below.

Arrangement Example 1 of First Vibration Plate

Figure 3:
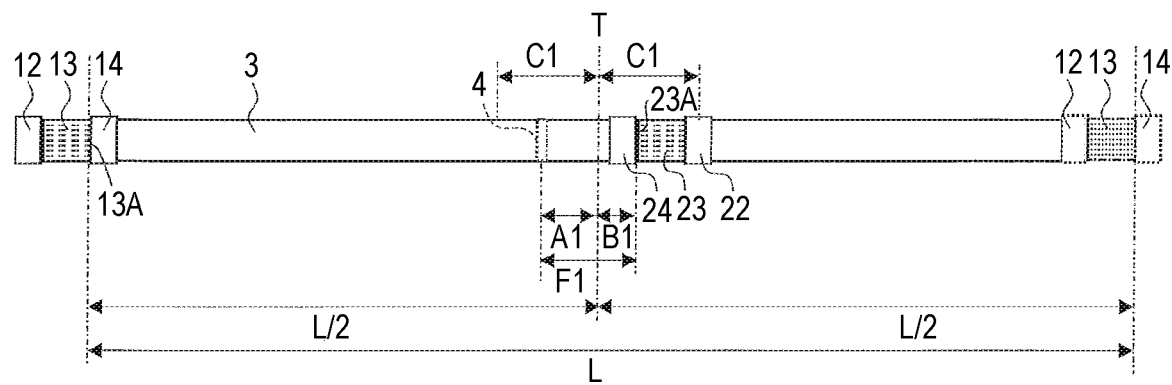
FIG. 3 shows an arrangement example of the first vibration plate 4.

FIG. 3 shows an arrangement example of the first vibration plate 4. In order to make description easy to understand, FIG. 3 expands and shows the loop pipe 3 shown in FIG. 1 linearly. In the arrangement example shown in FIG. 3, the one end 23A, where the first vibration plate 4 and the second high-temperature side heat exchanger 24 of the second stack 23 are disposed, is disposed within a first distance C1 with respect to a position T which is one half of a distance of a pipe length L of the loop pipe 3 (L/2) away from the one end 13A of the first stack 13. The first distance C1 can be, for example, one tenth of the pipe length L of the loop pipe 3 (L/10). The inventors found that the effect of amplifying the sound wave generated by the temperature gradient of the first stack 13 by the first vibration plate 4 can be further improved by setting the first distance C1 in this manner.

The first distance C1 may also be one twentieth of the pipe length L of the loop pipe 3 (L/20). Accordingly, the sound wave amplification effect of the first vibration plate 4 can be further improved. The first vibration plate 4 is disposed in a manner that a distance F1 between the one end 23A among the two ends of the second stack 23, where the second high-temperature side heat exchanger 24 is disposed, and the first vibration plate 4 is ¼ or less of the pipe length L of the loop pipe 3 (that is, F1≤L/4). In this configuration, the sound wave amplification effect of the first vibration plate 4 can be further improved. Preferably, the distance F1 can be equal to or less than ⅛ of the pipe length L of the loop pipe 3 (that is, F1≤L/8).

Arrangement Example 2 of First Vibration Plate

Figure 4:
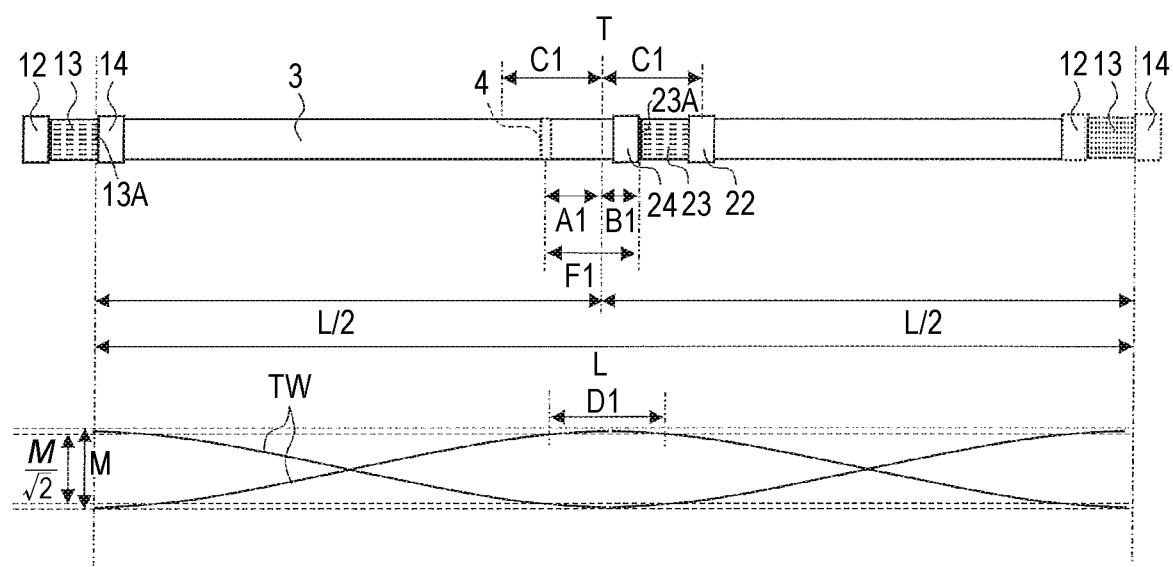
FIG. 4 shows another arrangement example of the first vibration plate 4.

FIG. 4 shows another arrangement example of the first vibration plate 4. In order to make description easy to understand, FIG. 4 expands and shows the loop pipe 3 shown in FIG. 1 linearly. A waveform example of a first mode frequency sound wave TW generated in the loop pipe 3 due to the temperature gradient of the stack 12 is shown in a lower portion of FIG. 4. In the example shown in FIG. 4, similar to FIG. 3, the one end 23A, where the first vibration plate 4 and the second high-temperature side heat exchanger 24 of the second stack 23 are disposed, is disposed within the first distance C1 with respect to the position T which is one half of the distance of the pipe length L of the loop pipe 3 (L/2) away from the one end 13A of the first stack 13.

In the arrangement example shown in FIG. 4, the first distance C1 is determined by a shape of the first mode frequency sound wave of the loop pipe 3 generated by the temperature gradient of the first stack 13. In the example shown in FIG. 4, the first distance C1 is a distance corresponding to a length (distance) D1 (C1=D1) of a continuous section of the loop pipe 3 in which an amplitude TA of the first mode frequency sound wave generated in the loop pipe 3 by the temperature gradient of the first stack 13 is between $1/\sqrt{2}M$ to $1M$ ($(1/\sqrt{2})M \leq TA \leq M$, M refers to a maximum amplitude). The inventors found that the effect of amplifying the sound wave generated by the temperature gradient of the first stack 13 by the first vibration plate 4 can be further improved by setting the first distance C1 in this manner.

The first distance C1 may also be a distance corresponding to a length (distance) of a continuous section of the loop pipe 3 in which the amplitude TA of the first mode frequency sound wave generated in the loop pipe 3 by the temperature gradient of the first stack 13 is between 0.9M to 1M ($0.9M \leq TA \leq M$, M refers to the maximum amplitude).

In the examples shown in FIGS. 3 and 4, the one end 23A of the second stack 23 and the first vibration plate 4 are disposed on opposite sides so as to sandwich the position T therebetween, the position T being one half of the distance of the pipe length L of the loop pipe 3 away from the one end 13A of the first stack 13 toward the one end 23A of the second stack 23. The inventors found that the effect of amplifying the sound wave generated by the temperature gradient of the first stack 13 by the first vibration plate 4 can be further improved by arranging the first stack 13, the second stack 23 and the first vibration plate 4 in this manner.

The one end 23A of the second stack 23 and the first vibration plate 4 may both be located within the first distance C1 from the position T on the same side with respect to the position T.

Arrangement Example 3 of First Vibration Plate

Figure 5:
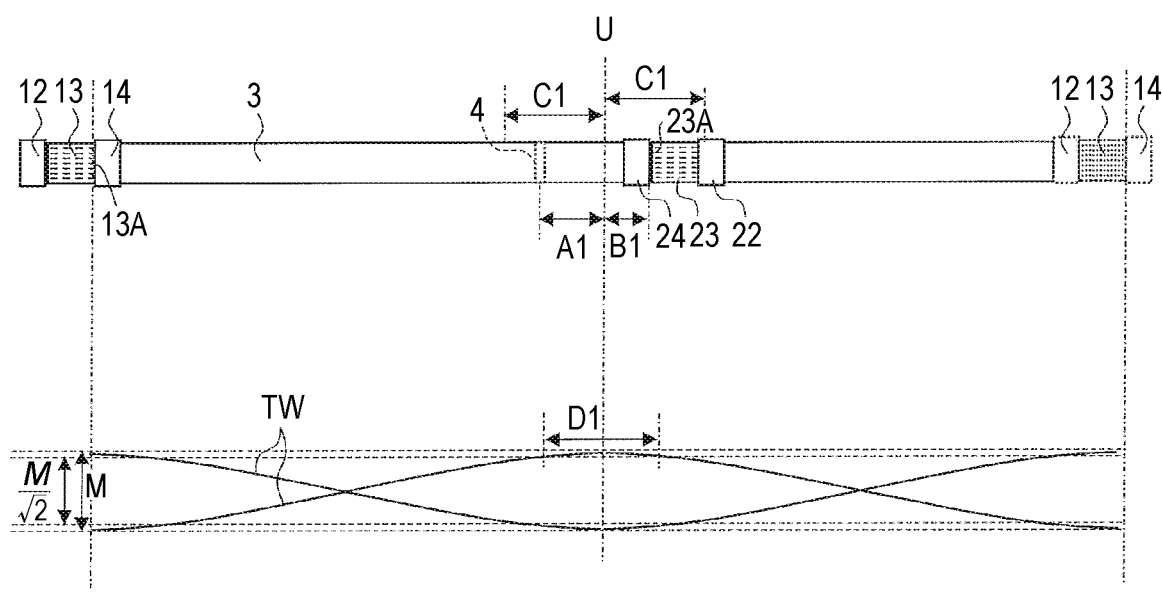
FIG. 5 shows another arrangement example of the first vibration plate 4.

FIG. 5 shows another arrangement example of the first vibration plate 4. In order to make description easy to understand, FIG. 5 expands and shows the loop pipe 3 shown in FIG. 1 linearly. A waveform example of the first mode frequency sound wave TW generated in the loop pipe 3 due to the temperature gradient of the stack 12 is shown in a lower portion of FIG. 5. In the arrangement example shown in FIG. 5, the first vibration plate 4 is disposed within the first distance C1 from an antinode position U of the first mode frequency sound wave generated in the loop pipe 3 by the temperature gradient of the first stack 13. In this example, the antinode position U is a position farther from the first stack 13 among positions where the amplitudes of the first mode frequency sound wave are the largest.

The first distance C1 is the distance corresponding to the length D1 (C1=D1) of the continuous section of the loop pipe in which the amplitude TA of the first mode frequency sound wave generated in the loop pipe 3 by the temperature gradient of the first stack 13 is between $1/\sqrt{2}M$ to $1M$ ($(1/\sqrt{2})M \leq TA \leq M$, M refers to the maximum amplitude of the sound wave). The first distance C1 may also be a distance corresponding to a length of a continuous section of the loop pipe 3 in which the amplitude TA of the sound wave is between 0.9M to 1M ($0.9M \leq TA \leq M$, M refers to the maximum amplitude). The inventors found that the effect of amplifying the sound wave generated by the temperature gradient of the first stack 13 by the first vibration plate 4 can be further improved by setting the first distance C1 in this manner.

In FIG. 5, the first distance C1 can be, for example, one tenth of the pipe length L of the loop pipe 3 (L/10), or one twentieth of the pipe length L of the loop pipe 3 (L/20). The inventors find that the effect of amplifying the sound wave generated by the temperature gradient of the first stack 13 by the first vibration plate 4 can be further improved by setting the first distance C1 from the antinode U of the sound wave in this manner.

[Stack End]

Figure 6:
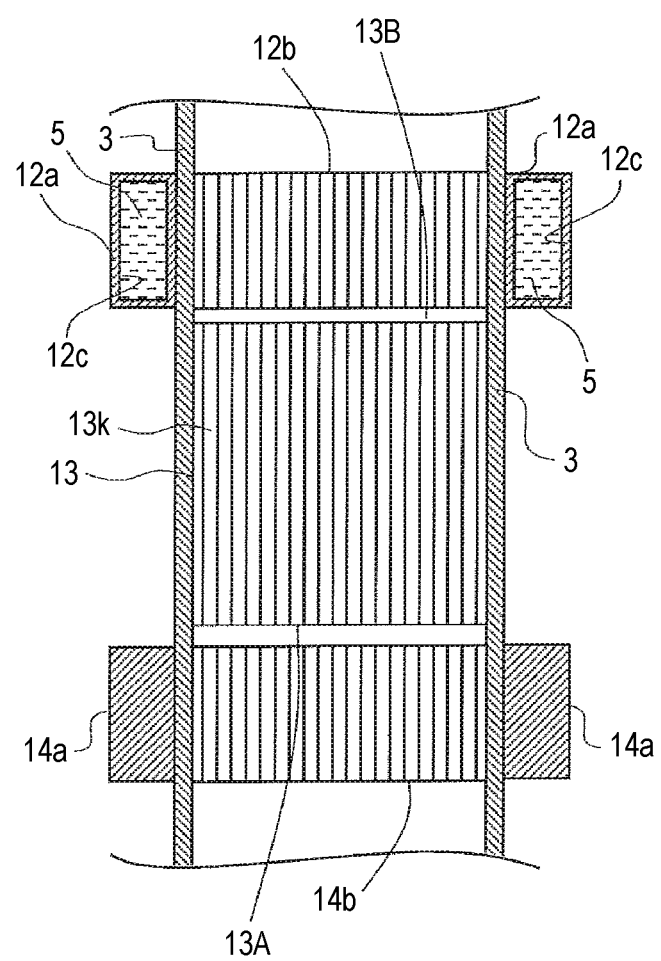
FIG. 6 is a sectional view showing a configuration example of a first stack, a first high-temperature side heat exchanger, and a first low-temperature side heat exchanger shown in FIG. 1.

FIG. 6 is a sectional view showing a configuration example of the first stack 13, the first high-temperature side heat exchanger 14, and the first low-temperature side heat exchanger 12 shown in FIG. 1. In the example shown in FIG. 6, the first low-temperature side heat exchanger 12 includes an in-pipe portion 12b and an out-pipe portion 12a. The in-pipe portion 12b is disposed oppositely to the other end 13B of the first stack 13 in the loop pipe 3. The in-pipe portion 12b includes a plurality of conduction paths passing through the length direction of the loop pipe 3. A working fluid can pass through the conduction path.

The out-pipe portion 12a surrounds an outer peripheral surface of the loop pipe 3 on the outside of the other end 13B of the first stack 13 in a radial direction. The out-pipe portion 12a includes a flow path 12c surrounding the outer peripheral surface of the loop pipe 3. A fluid 5 flows in the flow path 12c. The fluid 5 flows along a circumferential direction of the outer peripheral surface of the loop pipe 3. Not shown in the drawings, the flow path 12c includes an inlet for the fluid 5 to flow in and an outlet for the fluid 5 to flow out.

The first high-temperature side heat exchanger 14 includes an in-pipe portion 14b and an out-pipe portion 14a. The in-pipe portion 14b is disposed oppositely to the one end 13A of the first stack 13 in the loop pipe 3. The in-pipe portion 14b includes a plurality of conduction paths passing through the length direction of the loop pipe 3. A working fluid can pass through the conduction path. The out-pipe portion 14a surrounds the outer peripheral surface of the loop pipe 3 on the outside of the one end 13A of the first stack 13 in a radial direction. The out-pipe portion 14a is formed of a thermal conductor such as metal.

In the example shown in FIG. 6, the one end 13A of the first stack 13 is a surface opposite to the in-pipe portion 14b of the first high-temperature side heat exchanger 14. The other end 13B of the first stack 13 is a surface opposite to the in-pipe portion 12b of the first low-temperature side heat exchanger 12. The second stack 23 can also have the same configuration as in FIG. 6. In this case, the one end 23A of the second stack 23 is a surface opposite to an in-pipe portion of the second high-temperature side heat exchanger 24. The other end 23B of the second stack 23 is a surface opposite to an in-pipe portion of the second low-temperature side heat exchanger 22. In the second stack 23, a flow path similar to the flow path 12c shown in FIG. 6 can be provided in an out-pipe portion of the second high-temperature side heat exchanger 24.

Figure 7:
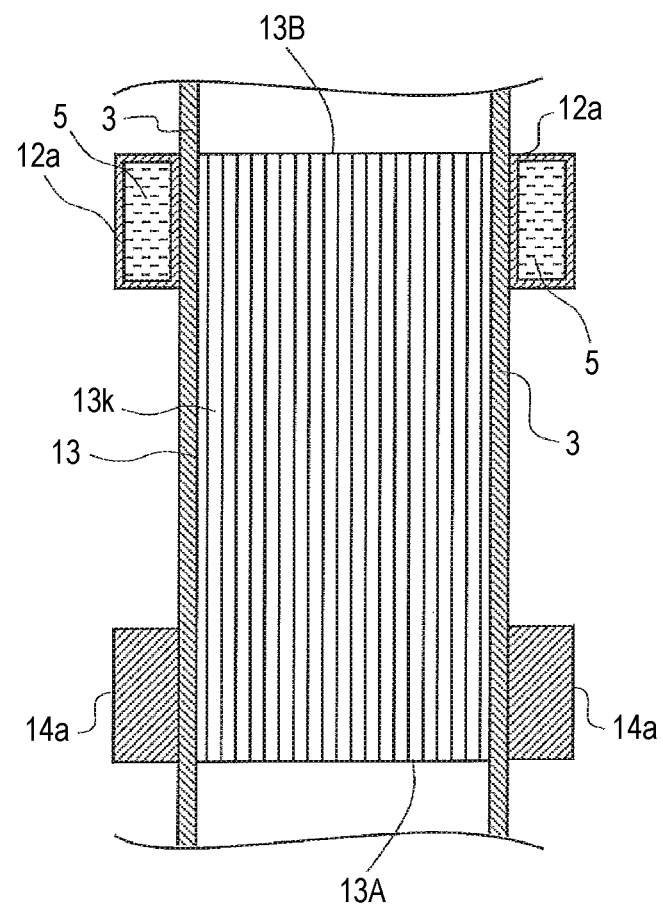
FIG. 7 is a sectional view showing another configuration example of the first stack, the first high-temperature side heat exchanger, and the first low-temperature side heat exchanger shown in FIG. 1.

FIG. 7 is a sectional view showing another configuration example of the first stack 13, the first high-temperature side heat exchanger 14, and the first low-temperature side heat exchanger 12 shown in FIG. 1. In the example shown in FIG. 7, the first high-temperature side heat exchanger 14 and the first low-temperature side heat exchanger 12 include no in-pipe portion, and are configured by out-pipe portions 14a and 12a. The out-pipe portion 14a surrounds a portion from an outer periphery of the loop pipe 3, the portion being inserted into the inside of the first stack 13 from the one end 13A of the first stack 13. The out-pipe portion 12a surrounds a portion from the outer periphery of the loop pipe 3, the portion being inserted into the inside of the first stack 13 from the other end 13B of the first stack 13.

In the configuration shown in FIG. 7, among two end surfaces of the first stack 13 in the length direction of the loop pipe 3, an end surface where the first high-temperature side heat exchanger 14 is provided is the one end 13A, and an end surface where the first low-temperature side heat exchanger 12 is provided is the other end 13B. When the second stack 23 is configured in the same manner as in FIG. 7, among two end surfaces of the second stack 23 in the length direction of the loop pipe 3, an end surface where the second high-temperature side heat exchanger 24 is provided is the one end 23A, and an end surface where the second low-temperature side heat exchanger 22 is provided is the other end 23B.

Embodiment 2

Figure 8:
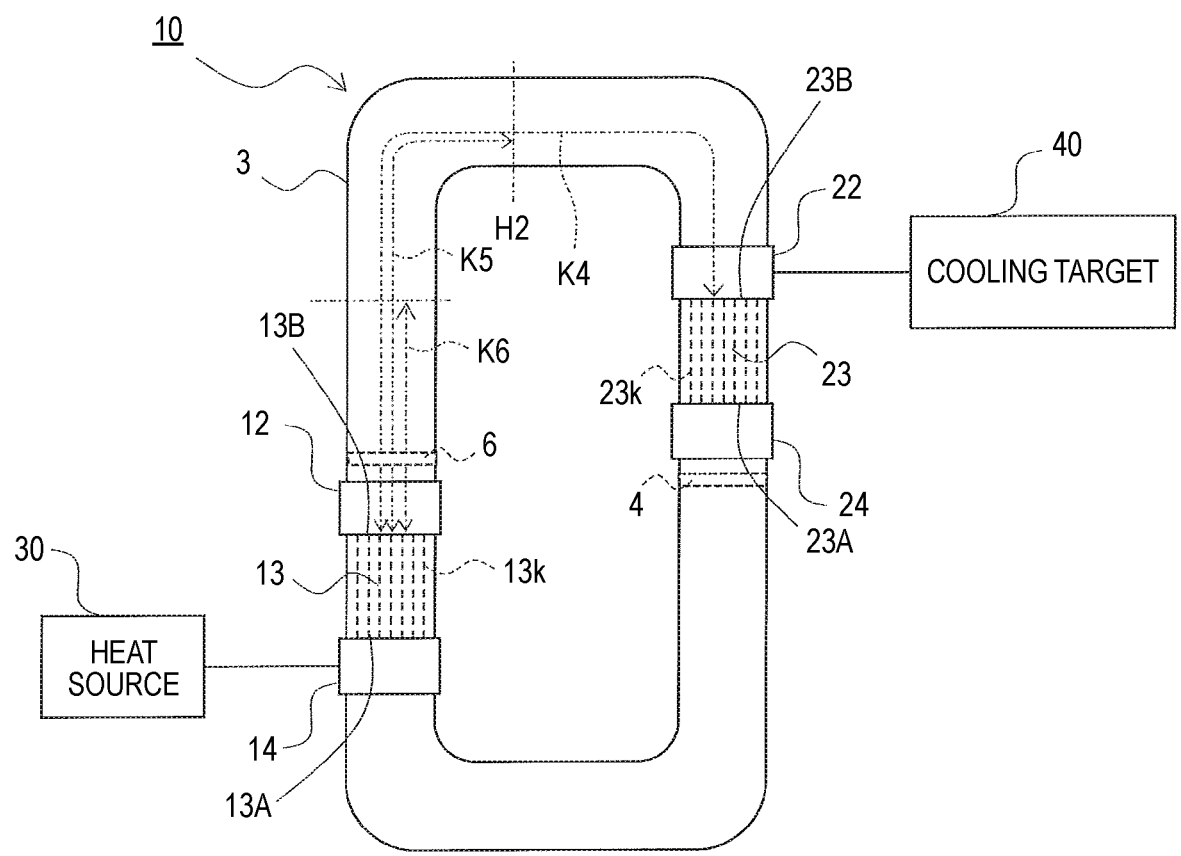
FIG. 8 shows a configuration example of a thermoacoustic device according to Embodiment 2.

FIG. 8 shows a configuration example of a thermoacoustic device according to the present embodiment. The thermoacoustic device 10 shown in FIG. 8 has a configuration in which a second vibration plate 6 is added to the configuration shown in FIG. 1. The second vibration plate 6 is provided in the loop pipe 3 between the other end 23B where the second low-temperature side heat exchanger 22 of the second stack 23 is disposed and the other end 13B of the first stack 13. The second vibration plate 6 is capable of vibrating in the axial direction (length direction) of the loop pipe 3. The second vibration plate 6 is formed of a plate-shaped elastic body. The second vibration plate 6 is disposed on a path K4 of the loop pipe 3 between the other end 13B of the first stack 23 and the other end 23B of the second stack 23. Through disposing the second vibration plate 6 at this position, the sound wave in the loop pipe 3 generated by the temperature gradient of the first stack 13 can be further amplified by the second vibration plate 6.

In the example shown in FIG. 8, the second vibration plate 6 is disposed at a position closer to the first stack 13 (a position on a path K5) than a position of a center H2 of a path K6 in the loop pipe 3 from the other end 13B of the first stack 13 to the other end 23B of the second stack 23. Accordingly, the sound wave amplification effect can be improved by the second vibration plate 6. Preferably, the second vibration plate 6 can be provided at a position in the path K4 of the loop pipe 3 from the other end 13B of the first stack 13 to the other end 23B of the second stack 23 within one fourth of a length of the path K4 on the side of the first stack 13 (a position on a path K6).

Arrangement Example 1 of Second Vibration Plate

Figure 9:
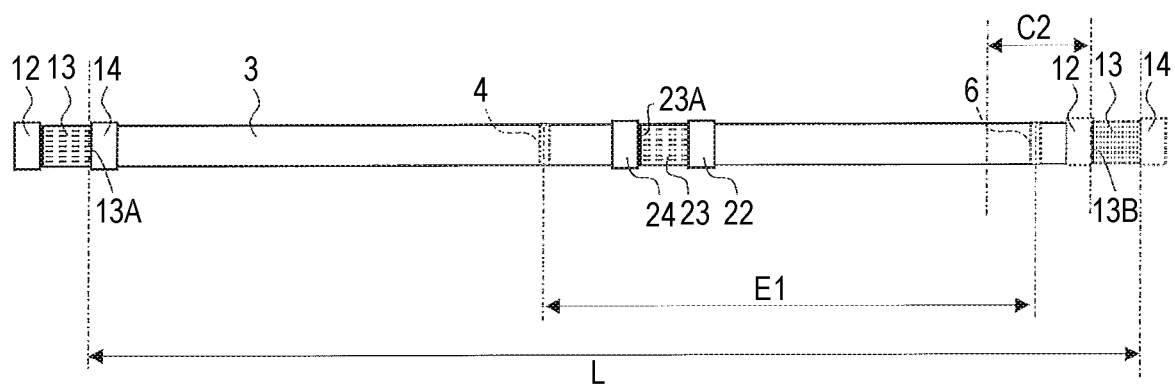
FIG. 9 shows an arrangement example of a second vibration plate.

FIG. 9 shows an arrangement example of the second vibration plate 6. In order to make description easy to understand, FIG. 9 expands and shows the loop pipe 3 shown in FIG. 8 linearly. In the arrangement example shown in FIG. 9, the second vibration plate 6 is disposed within a second distance C2 from the other end 13B where the first low-temperature side heat exchanger 12 of the first stack 13 is disposed. The second distance C2 can be, for example, one fourth of the pipe length L of the loop pipe 3 (L/4). That is, a distance between the other end 13B of the first stack 13 and the second vibration plate 6 can be ¼ or less of the pipe length L of the loop pipe 3. The inventors found that the effect of amplifying the sound wave generated by the temperature gradient of the first stack 13 by the second vibration plate 6 can be further improved by setting the second distance C2 in this manner. The second distance C2 may also be one eighth of the pipe length L of the loop pipe 3 (L/8). Accordingly, the sound wave amplification effect of the second vibration plate 6 can be further improved. More preferably, the second distance C2 can be, for example, one twentieth of the pipe length L of the loop pipe 3 (L/20).

Arrangement Example 2 of Second Vibration Plate

Figure 10:
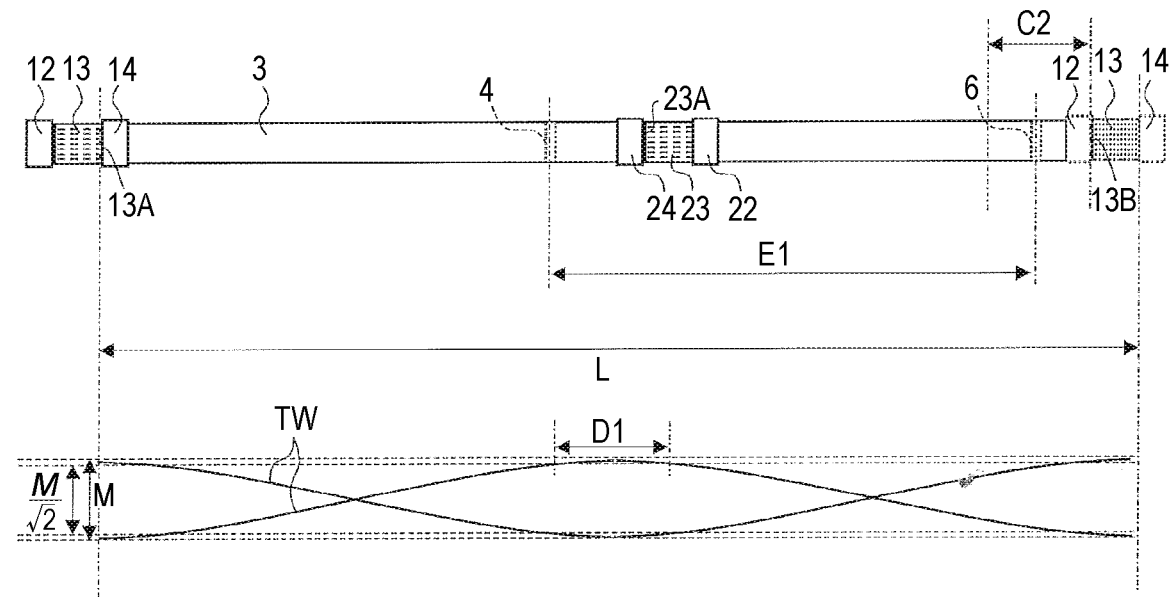
FIG. 10 shows another arrangement example of the second vibration plate.

FIG. 10 shows another arrangement example of the second vibration plate 6. FIG. 10 expands and shows the loop pipe 3 shown in FIG. 8 linearly. A waveform example of the first mode frequency sound wave TW generated in the loop pipe 3 due to the temperature gradient of the stack 12 is shown in a lower portion of FIG. 10. In the example shown in FIG. 10, similarly to FIG. 9, the second vibration plate 6 is disposed within the second distance C2 from the other end 13B of the first stack 13.

In the arrangement example shown in FIG. 10, the second distance C2 is determined by the shape of the first mode frequency sound wave of the loop pipe 3 generated by the temperature gradient of the first stack 13. In the example shown in FIG. 10, the second distance C2 is a distance corresponding to a length (distance) D1 (C2=D1) of a continuous section of the loop pipe 3 in which an amplitude TA of the first mode frequency sound wave generated in the loop pipe 3 by the temperature gradient of the first stack 13 is between $1/\sqrt{2}M$ to $1M$ $((1/\sqrt{2})M \leq TA \leq M$, M refers to the maximum amplitude of the sound wave). The inventors found that the effect of amplifying the sound wave generated by the temperature gradient of the second stack 23 by the second vibration plate 6 can be further improved by setting the second distance C2 in this manner.

The second distance C2 may also be a distance corresponding to the length of a continuous section of the loop pipe 3 in which the amplitude TA of the first mode frequency sound wave generated in the loop pipe 3 by the temperature gradient of the first stack 13 is between $0.9M$ to $1M$ $(0.9M \leq TA \leq M$, M refers to the maximum amplitude).

Arrangement Example 3 of Second Vibration Plate

Figure 11:
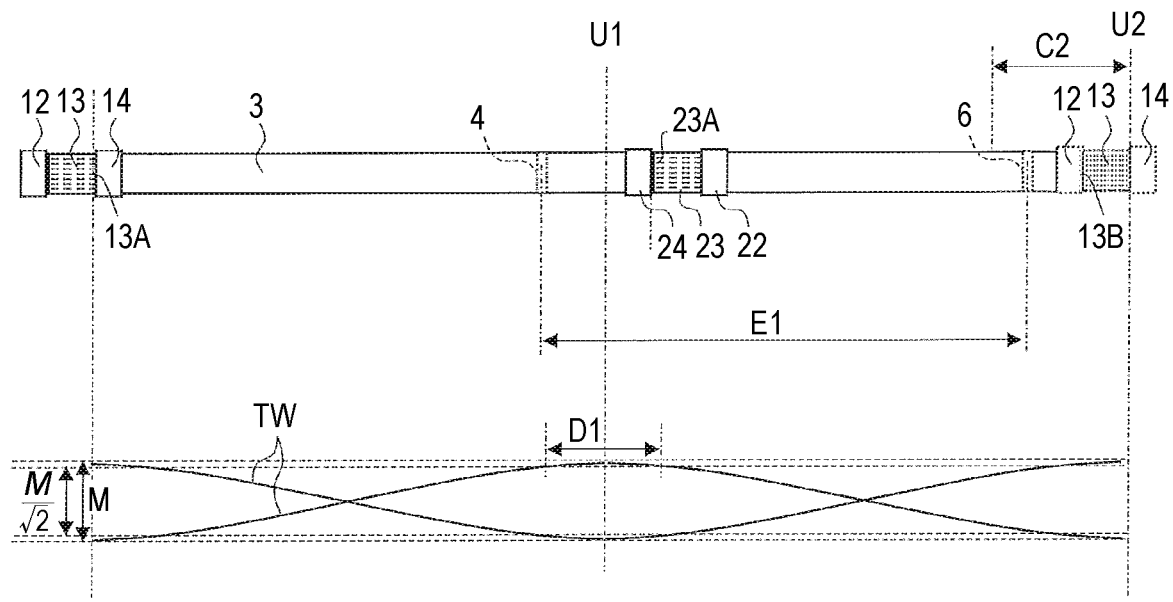
FIG. 11 shows another arrangement example of the second vibration plate.

FIG. 11 shows another arrangement example of the second vibration plate 6. In order to make description easy to understand, FIG. 11 expands and shows the loop pipe 3 shown in FIG. 8 linearly. A waveform example of the first mode frequency sound wave TW generated in the loop pipe 3 due to the temperature gradient of the stack 12 is shown in a lower portion of FIG. 11. In the arrangement example shown in FIG. 11, the second vibration plate 6 is disposed within the second distance C2 from an antinode position U2 of the first mode frequency sound wave generated in the loop pipe 3 by the temperature gradient of the first stack 13. In this example, the antinode position U2 is a position closer to the first stack 13 among positions U1 and U2 where the amplitudes of the first mode frequency sound wave are the largest.

The second distance C2 is the distance corresponding to the length D1 (C2=D1) of the continuous section of the loop pipe 3 in which the amplitude TA of the first mode frequency sound wave generated in the loop pipe 3 by the temperature gradient of the first stack 13 is between $1/\sqrt{2}M$ to $1M$ $((1/\sqrt{2})M \leq TA \leq M$, M refers to the maximum amplitude of the sound wave). The second distance C2 may also be a distance corresponding to a length of a continuous section of the loop pipe 3 in which the amplitude TA of the sound wave is between $0.9M$ to $1M$ $(0.9M \leq TA \leq M$, M refers to the maximum amplitude of the sound wave). The inventors found that the effect of amplifying the sound wave generated by the temperature gradient of the first stack 13 by the second vibration plate 6 can be further improved by setting the second distance C2 in this manner.

In FIG. 11, the second distance C2 can be, for example, one fourth of the pipe length L of the loop pipe 3 (L/4), or one eighth of the pipe length L of the loop pipe 3 (L/8), or one twentieth of the pipe length L of the loop pipe 3 (L/20). The inventors find that the effect of amplifying the sound wave generated by the temperature gradient of the first stack 13 by the second vibration plate 6 can be further improved by setting the second distance C2 from the antinode U2 of the sound wave in this manner.

In Arrangement Examples 1 to 3 of the second vibration plate 6 shown in FIGS. 9 to 11, the first vibration plate 4 can be disposed, for example, according to any one of Arrangement Examples 1 to 3 of the first vibration plate 4 shown in FIGS. 3 to 5. In Arrangement Examples 1 to 3 of the second vibration plate 6 shown in FIGS. 9 to 11, a distance E1 between the first vibration plate 4 and the second vibration plate 6 can be, for example, one half of the pipe length L of the loop pipe 3. Accordingly, the sound wave amplification effect can be further improved by addition of the second vibration plate 6.

[Vibration Plate Material]

The first vibration plate 4 and the second vibration plate 6 in Embodiments 1 to 2 can be formed of, for example, metal or resin. The inventors conducted various studies on materials of the first vibration plate 4 and the second vibration plate 6 for efficiently amplifying the sound wave of the loop pipe 3 generated by the temperature gradient of the first stack 13. As a result, from a viewpoint of sound wave amplification, it is found that the first vibration plate 4 and the second vibration plate 6 are preferably made of a material having a low viscosity, such as resin or metal, rather than a material having a high viscosity, such as rubber.

For example, a loss factor tan δ of the first vibration plate 4 when vibrating at a resonance frequency at 25° C. preferably satisfies 0≤tan δ≤0.5. The sound wave amplification effect of the first vibration plate 4 is more easily obtained when the first vibration plate 4 is formed of a material having a loss factor tan δ of 0.5 or less. The loss factor tan δ more preferably satisfies 0≤tan δ≤0.2, still more preferably satisfies 0≤tan δ≤0.025.

Similarly, a loss factor tan δ of the second vibration plate 6 when vibrating at a resonance frequency at 25° C. preferably satisfies 0≤tan δ≤0.5. The sound wave amplification effect of the second vibration plate 6 is more easily obtained when the second vibration plate 6 is formed of the material having the loss factor tan δ of 0.5 or less. The loss factor tan δ more preferably satisfies 0≤tan δ≤0.2, still more preferably satisfies 0≤tan δ≤0.025.

Figure 12:
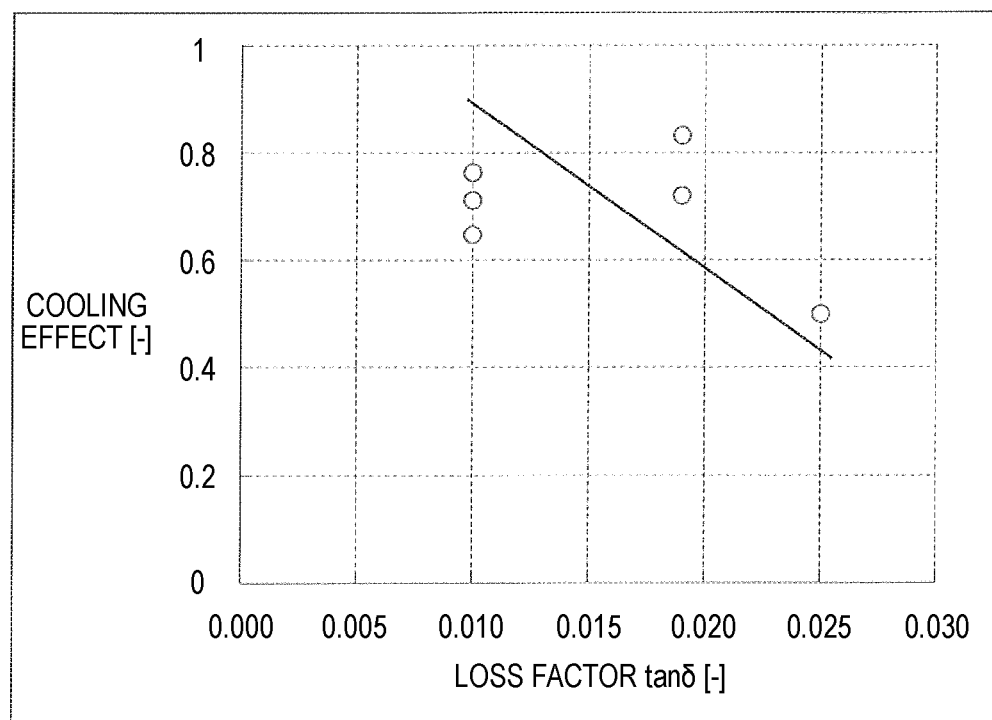
FIG. 12 is a graph showing a result of a measurement of a relationship between a loss factor tan δ of the first vibration plate 4 and a cooling effect of the thermoacoustic device.

FIG. 12 is a graph showing a result of a measurement of a relationship between the loss factor tan δ of the first vibration plate 4 and a cooling effect of the thermoacoustic device 10. In the measurement shown in FIG. 12, vibration plates having various loss factors were used as the first vibration plate 4 of the thermoacoustic device 10 shown in FIG. 1 to measure the cooling effect of the thermoacoustic device 10. The cooling effect is represented by a value obtained by dividing a temperature difference between the second low-temperature side heat exchanger 22 and the second high-temperature side heat exchanger 24 during operation of the thermoacoustic device 10 by a predetermined reference temperature. The loss factor tan δ refers to elasticity loss modulus G″/elasticity storage modulus G′, and can be considered as a ratio of viscosity and elasticity. The loss factor tan δ was measured using a dynamic viscoelasticity measurement device. That is, a stress was input to the vibration plate, and a phase difference δ of a response to the input stress was measured. The loss factor tan δ was measured by adding a stress for the first vibration plate 4 to vibrate at a resonance frequency in an atmosphere of 25° C. to the first vibration plate 4 to measure a phase difference with respect to the input stress of response deformation of the first vibration plate 4.

From the measurement result shown in FIG. 12, it was found that the cooling effect of the thermoacoustic device 10 was particularly good when the loss factor tan δ of the first vibration plate 4 was in a range of 0≤tan δ≤0.025. A better cooling effect was obtained when the loss factor tan δ of the first vibration plate 4 was 0.020 or less.

The present inventors found that the sound wave of the loop pipe 3 generated by the temperature gradient of the first stack 13 could be efficiently amplified when the ratio of the driven frequency D of the first vibration plate 4 and the resonance frequency F of the loop pipe 3 (D/F) was close to 1. For example, a lower limit of D/F preferably satisfies D/F≥0.8, more preferably satisfies D/F≥0.85, and still more preferably satisfies D/F≥0.9. An upper limit of D/F, for example, preferably satisfies D/F≤1.1, and more preferably satisfies D/F≤1.0. A range of D/F, for example, preferably satisfies 1.1≥D/F≥0.8, and more preferably satisfies 1.0≥D/F≥0.85.

The driven frequency D refers to a frequency of the first vibration plate 4 vibrated by vibration of the sound wave of the loop pipe 3. For example, a resonance frequency of the first vibration plate 4 can be set to a value close to the resonance frequency F of the loop pipe 3 to make the ratio between the driven frequency D and the resonance frequency F of the loop pipe 3 (D/F) close to 1. Even when the resonance frequency of the first vibration plate 4 is smaller than the resonance frequency F of the loop pipe 3, for example, the resonance frequency of the first vibration plate 4 can be set in a manner that a high harmonic frequency of the resonance frequency of the first vibration plate 4 is close to the resonance frequency F of the loop pipe 3.

Similarly to the first vibration plate 4, a ratio between a driven frequency D2 of the second vibration plate 6 and the resonance frequency F of the loop pipe 3 (D2/F) is preferably close to 1.

Figure 13:
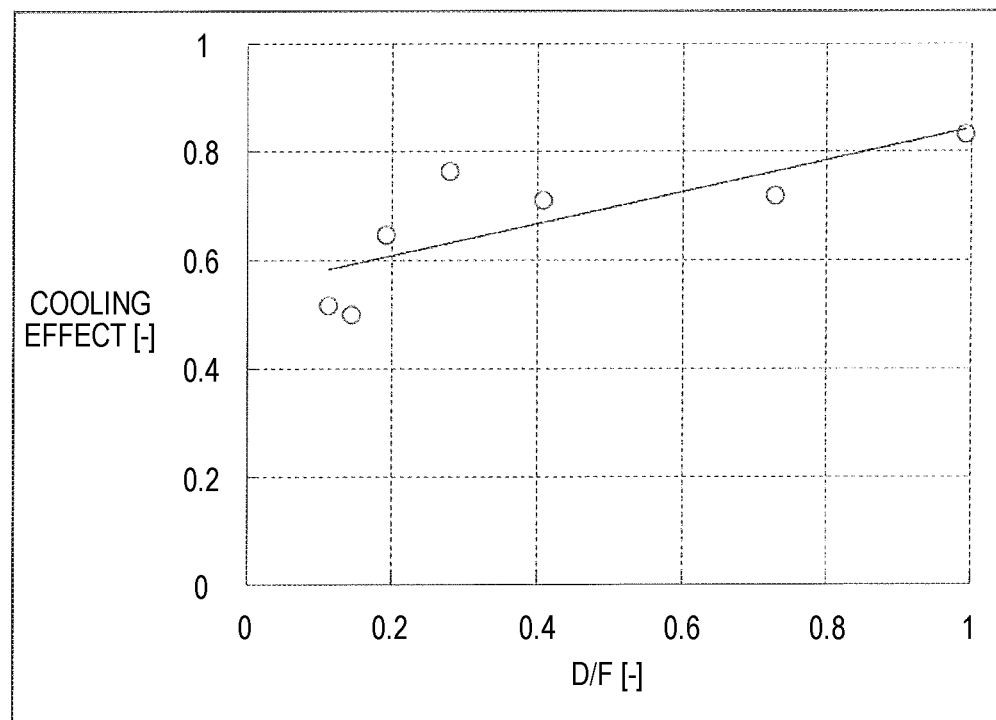
FIG. 13 is a graph showing a result of a measurement of a relationship between a ratio of a driven frequency D of the first vibration plate 4 and a resonance frequency F of the loop pipe 3 (D/F) and the cooling effect of the thermoacoustic device.

FIG. 13 is a graph showing a result of a measurement of a relationship between the ratio of the driven frequency D of the first vibration plate 4 and the resonance frequency F of the loop pipe 3 (D/F) and the cooling effect of the thermoacoustic device 10. In the measurement shown in FIG. 13, the cooling effect of the thermoacoustic device 10 was measured by changing the configuration of the first vibration plate 4 of the thermoacoustic device 10 shown in FIG. 1 on a premise that the sound wave of the loop pipe 3 is a fundamental wave. The driven frequency D of the first vibration plate 4 was measured by inputting vibration of various frequencies to the first vibration plate 4. The resonance frequency F of the loop pipe 3 was measured by inputting vibration of various frequencies to the loop pipe 3. The cooling effect is represented by the value obtained by dividing the temperature difference between the second low-temperature side heat exchanger 22 and the second high-temperature side heat exchanger 24 during operation of the thermoacoustic device 10 by a predetermined reference temperature.

In the measurement result of FIG. 13, the resonance frequency F of the loop pipe 3 was a first mode frequency of the loop pipe 3.

From the measurement result shown in FIG. 13, it was found that the ratio between the driven frequency D of the first vibration plate 4 and the resonance frequency F of the loop pipe 3 (D/F) is preferably close to 1. Specifically, D/F preferably satisfies 1.0≥D/F≥0.8, more preferably satisfies 1.0≥D/F≥0.85, and still more preferably satisfies 1.0≥D/F≥0.9.

[Resonance Frequency of Vibration Plate]

Resonance frequencies of the first vibration plate 4 and the second vibration plate 6 can be estimated (calculated) mainly from area, thickness, and bending rigidity of the vibration plates. The resonance frequency of the loop pipe 3 can be estimated (calculated) mainly from the pipe length L of the loop pipe 3. For example, resonance frequencies fns of the first vibration plate 4 and the second vibration plate 6 can be calculated by Equation 1 below. Equation 1 below is for a case where the vibration plate is a circular film.

[Equation 1]

$$f_{ns} = \frac{\lambda_{ns}}{2R}\sqrt{\frac{T}{\rho_a}} \quad (1)$$

R: Radius of Circular Film
T: Constant Tension Per Unit Length (N/m)
ρ α: Mass Per Unit Area
n in λns: Degree in Circumferential Direction (Number of Node Diameter)
s in λns: Degree in Radial Direction (Number of Node Circle)

Figure 14:
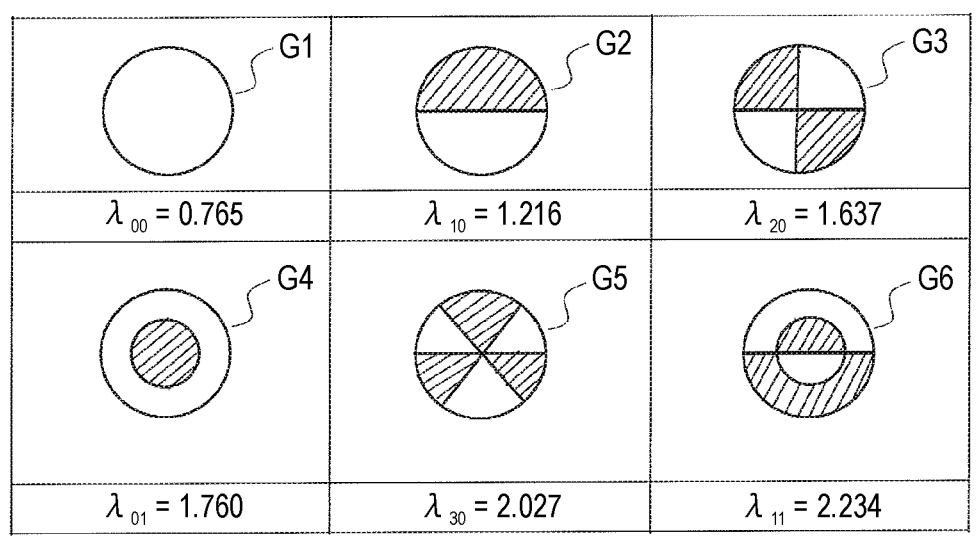
FIG. 14 shows an example of an eigenmode and an eigenvalue of a circular film vibration plate.

FIG. 14 shows an example of an eigenmode and an eigenvalue λns of a circular film vibration plate. In FIG. 14, white portions and shaded portions in a circle show vibration at different phases. For example, an eigenmode G1 shown in FIG. 14 is an eigenmode which corresponds to node diameter number n=0 and node circle number s=0. In this case, an eigenvalue λ00 equals to 0.765. An eigenmode G2 is an eigenmode which corresponds to node diameter number n=1 and node circle number s=0. In this case, an eigenvalue λ10 equals to 1.216.

As described above, it is easy to design the vibration plate capable of efficiently amplifying the sound wave in the loop pipe by calculating the resonance frequency of the vibration plate. For example, the effect of amplifying the sound wave of the loop pipe 3 by the first vibration plate 4 can be efficiently improved by combining Arrangement Examples 1 to 3 of the first vibration plate in Embodiment 1 and preferable material properties of the vibration plate.

The effect of amplifying the sound wave of the loop pipe 3 by the first vibration plate 4 can be achieved by using the preferred examples described above as the material of the first vibration plate 4, regardless of a position of the first vibration plate 4. For example, in another embodiment, a vibration plate having the same configuration as the first vibration plate 4 can be disposed in the loop pipe 3, the loop pipe 3 including the first stack 13 between the first high-temperature side heat exchanger 14 and the first low-temperature side heat exchanger 12 and the second stack 23 between the second high-temperature side heat exchanger 24 and the second low-temperature side heat exchanger 22. In this configuration, the loss factor tan δ can satisfy 0≤tan δ≤0.5 at a time when a vibration plate vibrates at the resonance frequency at 25° C. Preferably, the loss factor tan δ of the vibration plate can be 0.2 or less, more preferably 0.025 or less. Accordingly, the effect of amplifying the sound wave in the loop pipe 3 by the vibration plate can be obtained wherever the vibration plate is disposed in the loop pipe 3. Alternatively, the driven frequency D of the vibration plate and the resonance frequency F of the loop pipe can have a relationship of D/F≥0.8. Accordingly, the effect of amplifying the sound wave in the loop pipe 3 by the vibration plate can be obtained.

Although the embodiments of the invention are described above, the invention is not limited to the above embodiments. The configurations of the stacks 13 and 23 are not limited to the above examples. For example, the plurality of conduction paths 13k and 23k passing through the length direction of the pipe 3 of the first stack 13 and the second stack 23 may be curved.

The thermoacoustic device 10 uses the temperature gradient of the second stack to cool an object outside the loop pipe. Use of the thermoacoustic device is not limited to a cooling device. For example, the thermoacoustic device 10 can be, for example, a thermoacoustic heating device that uses the temperature gradient of the second stack to heat an object outside the loop pipe.

This application is based on Japanese Patent Application Number 2016-204530 filed on Oct. 18, 2016, the content of which is incorporated herein by reference.

REFERENCE SIGNS LIST

10: Thermoacoustic Device
12: First Low-Temperature Side Heat Exchanger
13: First Stack
14: First High-Temperature Side Heat Exchanger
22: Second Low-Temperature Side Heat Exchanger
23: Second Stack
24: Second High-Temperature Side Heat Exchanger
4: First Vibration Plate
6: Second Vibration Plate

The invention claimed is:
1. A thermoacoustic device comprising:
a loop pipe;
a first stack disposed within the loop pipe, the first stack generating a sound wave in the loop pipe by a temperature gradient in the first stack;
a second stack disposed within the loop pipe, the second stack generating a temperature gradient in the second stack by the sound wave of the loop pipe;
a first high-temperature side heat exchanger disposed at one end of the first stack which brings the one end of the first stack to a higher temperature than another end of the first stack;
a first low-temperature side heat exchanger disposed at the other end of the first stack which brings the other end of the first stack to a lower temperature than the one end;
a second high-temperature side heat exchanger disposed at an end, which is closer to the first high-temperature side heat exchanger, among two ends of the second stack;
a second low-temperature side heat exchanger disposed at an end, which is closer to the first low-temperature side heat exchanger, among two ends of the second stack; and
a first vibration plate, disposed in the loop pipe between the end of the second stack where the second high-temperature side heat exchanger is disposed and the one end of the first stack, which vibrates in an axial direction of the loop pipe such that a peak amplitude of the sound wave generated within the loop pipe is disposed between the first vibration plate and the second low-temperature side heat exchanger.

2. The thermoacoustic device according to claim 1,
wherein the end among the two ends of the second stack, where the second high-temperature side heat exchanger is disposed, and the first vibration plate are disposed within a first distance with reference to a position at a distance of one half of a pipe length of the loop pipe from the one end of the first stack, and
wherein the first distance corresponds to a length of a part of the loop pipe in which a amplitude of a sound wave is $1/\sqrt{2}$ to 1 times with respect to a maximum amplitude of the sound wave, the sound wave being a first mode frequency sound wave generated in the loop pipe by the temperature gradient of the first stack.

3. The thermoacoustic device according to claim 1,
wherein a distance between the end among the two ends of the second stack where the second high-temperature side heat exchanger is disposed and the first vibration plate is equal to or less than ¼ of a pipe length of the loop pipe.

4. The thermoacoustic device according to claim 1, further comprising:
a second vibration plate, disposed in the loop pipe between the end among the two ends of the second stack where the second low-temperature side heat exchanger is disposed and the other end of the first stack, which vibrates in the axial direction of the loop pipe.

5. The thermoacoustic device according to claim 4,
wherein the second vibration plate is disposed within a second distance from the end among the two ends of the first stack where the first low-temperature side heat exchanger is disposed, and
wherein the second distance corresponds to a length of a part of the loop pipe in which the amplitude of the sound wave is $1/\sqrt{2}$ to 1 times with respect to the maximum amplitude of the sound wave, the sound wave being a first mode frequency sound wave generated in the loop pipe by the temperature gradient of the first stack.

6. The thermoacoustic device according to claim 1,
wherein a loss factor tan δ satisfies 0≤tan δ≤0.5 at a time when the first vibration plate vibrates at a resonance frequency at 25° C.

7. The thermoacoustic device according to claim 1,
wherein a driven frequency D of the first vibration plate and a resonance frequency F of the loop pipe have a relationship of D/F≥0.8.

8. The thermoacoustic device according to claim 1,
wherein the first vibration plate is made of resin or metal.

9. The thermoacoustic device according to claim 1,
wherein the first vibration plate is disposed within the first distance from an antinode position of the first mode frequency sound wave generated in the loop pipe by the temperature gradient of the first stack, and
wherein the first distance corresponds to a length of a part of the loop pipe in which the amplitude of the sound wave is $1/\sqrt{2}$ to 1 times with respect to the maximum amplitude of the sound wave, the sound wave being a first mode frequency sound wave generated in the loop pipe by the temperature gradient of the first stack.

10. The thermoacoustic device according to claim 1,
wherein the end among the two ends of the second stack where the second high-temperature side heat exchanger is disposed and the first vibration plate are disposed on opposite sides so as to sandwich a position located one half the pipe length of the loop pipe away from the one end of the first stack.

11. The thermoacoustic device according to claim 1,
wherein the first vibration plate is disposed at a position closer to the second stack than a center position of a path in the pipe from the end among the two ends of the second stack where the second high-temperature side heat exchanger is disposed to the one end of the first stack.

* * * * *